United States Patent Office 3,793,276
Patented Feb. 19, 1974

3,793,276
PLASTICS COMPOSITIONS
Geoffrey Vincent Dallow Blunt and Newton John Hodges, Cheltenham, England, assignors to Coal Industries (Patents) Limited, London, England
No Drawing. Filed Dec. 3, 1971, Ser. No. 204,744
Claims priority, application Great Britain, Dec. 22, 1970, 60,768/70
Int. Cl. C08g 51/52
U.S. Cl. 260—28
6 Claims

ABSTRACT OF THE DISCLOSURE

The invention provides a plastics composition for use as a joint sealant consisting essentially of an oil-extended coal digest having a needle penetration index, converted to a Ring and Ball softening point of 85° C., of at least 10, and preferably at least 15, and an epoxide resin compatible therewith. The preferred epoxide resins are flexible epoxide resins, formed, for example, from the diglycidyl ethers of polyalkyleneglycols or polymethylene diols. The invention further includes a two-part system for the plastics composition comprising, in the two parts, the constituents of such plastics compositions, one of the parts containing the epoxide and the other part containing the hardener therefor. The two parts may be mixed and poured into the joint at ambient temperature.

---

This invention relates to plastics compositions. In particular it relates to the plastics compositions of a type suitable to be employed as sealants for joints or cracks between slabs of concrete.

Concrete, when laid in large areas, for example in roads, airfield runways and parking strips, and the like, is normally laid with joints to allow for expansion and contraction of the concrete. It is necessary to provide the joints with sealants to prevent water and other split materials penetrating under the concrete, to prevent undesirable gaps appearing in the surface and to improve ridability over the surface. Gaskets, particularly cellular gaskets, elastomers and mastics have been used as sealants for gaps in the concrete. The present invention is concerned with a mastic composition which may be applied as a sealant either in strip or fluid form.

Particularly in airfield runways and taxiways, the sealant is subjected to considerable adverse conditions. For example it may suffer from jet blast, abrasion and vibration, as well as elevated temperatures, either naturally or from the jet blast, and low ambient temperatures. It is also subject to attack by spilled aviation fuel, diesel fuel, oils and de-icing fluids. Most of the sealants hitherto applied in fluid form deteriorate and require to be replaced at relatively frequent intervals. It is therefore a considerable economic advantage to provide a sealant that is more resistant to the adverse conditions experienced in such circumstances and that can be applied in a fluid form. The important properties of a sealant are its flexibility and resilience, so that the joint may expand and contract freely. The sealant must retain this flexibility and resilience throughout its life, when subjected to a large number of extensions and compressions, and during adverse temperature conditions.

It has been proposed to use bituminous substances in general in admixture with epoxide resins for these purposes. The compositions proposed hitherto have had particular disadvantages. Bitumens, by which term is meant the heavy ends from petroleum refining process, are more difficult to formulate. They are relatively incompatible with epoxide resins so that it is not possible satisfactorily to formulate a sealant with a high proportion of epoxide resin. Furthermore, bitumens deteriorate over a period of time, so that the joints will have a relatively low economic life. Bitumens also have a disadvantage that they are relatively rapidly attacked by the fuels and other solvents of the kind hereinbefore described. This factor also tends to lower the economic life of the joint.

Pitches and tars derived from coal by the destructive distillation thereof have certain advantages compared with bitumens. They are relatively more resistant to fuel and other solvents of the kind hereinbefore described. They are also more resistant to deterioration compared with bitumens. Unfortunately, the rheological properties of bitumens and coal tar pitches differ substantially. Coal tar pitches are hard and brittle whereas bitumens are relatively softer and more ductile. For use as joint sealants, it is essential that the plastics compositions should be flexible and resilient, which properties are not so easily attainable in compositions formulated with coal tar pitches as with bitumens. Accordingly, it has not been the general practice to formulate joint sealants that can be applied at ambient temperatures employing coal tar pitches.

The present invention provides a plastics composition for use as a joint sealant consisting essentially of an oil-extended coal digest having a needle penetration index, converted to a Ring and Ball softening point of 85° C., of at least 10, and preferably at least 15, and an epoxide resin compatible therewith .

Coal digest is the product formed by the treatment of coal with a pitch, tar, high-boiling oil or other solvent at an elevated temperature, for example 300° C. to 450° C., whereby the coal, or as much thereof as is practical to dissolve, is dissolved in the pitch, tar, oil or other solvent. The coal is not present as a discrete phase, as is the case when the coal is suspended in the pitch, tar, oil or other solvent, but is present in solution either as itself, or in a solvolyzed form.

It has been suggested that a coal digest may comprise a two phase system including the pitch, tar, oil, or other solvent in which partially solvolyzed coal is suspended. Insofar as the present invention is concerned, such a suspension is a permanent one and the coal digest may be considered as a single phase system. It is believed that the coal digest may be partly colloidal.

There will be a certain proportion of the coal, mostly, ash, which will be insoluble in the pitch, tar, oil or other solvent. This proportion may be filtered off. The coal digest may be considered as a solution or extract of coal. It may be unnecessary to filter off the insoluble matter for purposes of the present invention as the insoluble matter, which will be finely divided, may be considered as a filler. It will be understood that the properties of the coal digest may be varied by varying the coal, the pitch, tar, oil or other solvent employed, the relative quantities thereof and other conditions, particularly temperature, of its formation.

A relatively high needle pentration index of the coal digest is preferred, in principle. However, it has been found that coal digests having needle penetration indices of above 25, converted to a softening point of 85° C., are difficult to manufacture. A needle penetration index of up to about 45, converted to a softening point of 85° C., is particularly suitable.

The coal digest is extended by an oil or tar compatible with the coal digest and such digest is known herein as an oil-extended coal digest. For a digest having a softening point of about 85° C., it will generally be convenient to add between 0.5 and 1 part of oil or tar to each part of the coal digest. In general, suitable oils and tars are formed by the destructive distillation of coal and do not include the relatively volatile "oils" comprising mainly noncyclic hydrocarbons which will generally be found to be incompatible with the coal digest. Heavy oils, particularly having boiling points in excess of 300° C., are preferred.

The coal digest, when so extended with the oil or tars, will generally have a specific gravity at 25° C. of between 1.75 and 1.90 mg./m.³, and should preferably be between 1.80 and 1.85. The term "oil-extended coal digest" is to be understood as meaning such a coal digest extended with oil or tar.

It is believed that the effect of the oil or tar is mainly to modify the viscosity of the coal digest so that the plastics composition can achieve the desired degree of flow, when pouring before curing, and also to act as an extender to the coal digest, when the plastics composition is cured. It will therefore be clear that the exact use to which the plastics composition is to be put will govern the amount of oil or tar employed.

The plastics compositions of the present invention can be formulated in a considerable variety of ways. The epoxide resin may be any of a considerable variety of epoxide resins compatible with the coal digest. Other constituents may be added and the proportions may be varied. It is believed, however, that the use of the selected coal digest surprisingly enables compositions of greatly improved flexibility and resilience relative to equivalent compositions employing coal tar pitch, and of greatly improved solvent resistance and epoxides compatibility and a diminished tendency to deteriorate relative to equivalent compositions employing bitumens.

Coal digests having a needle penetration index of below 10, when converted to a softening point of 85° C., are not suitable for compounding into plastics compositions similar to those of this invention. Any composition made from them will suffer from a disadvantage relative to those of the present invention. For example they may be too hard or be insufficiently resistant to fuels, or too inflexible. It has been found that the compounding of compositions based on such coal digests having penetration indices, converted to a softening point of 85° C., of less than 10 cannot be done employing readily available conventional cheap materials without a sacrifice in properties.

The needle penetration index of a material is that distance that a standard needle penetrates vertically into a sample of the material under fixed conditions of loading, time and temperature. The method used herein is that of Institute of Petroleum Standard method of testing I.P. 49/67, which is believed not significantly to differ from the A.S.T.M. D5 method. In this method the needle penetration index is that distance, measured in tenths of a millimeter, that the standard needle penetrates into the sample when applied thereto for 5 seconds by means of a penetrometer under a load of 100 g. and at 25° C.

The extension of the coal digest with oil or tar will involve the variation of both the softening point and the index of the coal digest. Accordingly, the needle penetration index specified for the purposes of this invention must be taken with reference to a particular softening point of coal digest, 85° C. In respect of coal digests having softening points other than 85° C. the softening point must be converted to 85° C. before the needle penetration index is measured. If the softening point of the coal digest is below 85° C., the coal digest is distilled in an inert atmosphere or in vacuo to remove low-boiling impurities. If the softening point of the coal digest is above 85° C., oil or tar extender is added to diminish the softening point 85° C. In each case the distillation or addition is continued until the softening point is 85° C. The value of the needle penetration index of this product, having the 85° C. softening point, is the needle penetration, index, converted to a softening point of 85° C., of the original coal digest. Any extender employed should desirably be that, if any, to be employed in the plastics composition of the present invention. If no extender is to be employed in the plastics composition, the extender should have an immeasurably large needle penetration index (over 500) under the standard conditions so that it does not contribute substantially to the needle penetration index of the coal digest.

Any epoxide resin compatible with the coal digest may be employed for the plastics composition of the present invention. It will be understood, however, that epoxide resins vary widely and the characteristics of joints in concrete will vary accordingly to their design. It is thus not possible to state the kinds of epoxide resin that will be most suitable in particular circumstances. As a general guide, it is preferred to employ a flexible epoxide resin in such plastics compositions. Those of skill in the art of formulation of epoxide resin compositions will be well aware of the kinds of epoxide resins known as flexible epoxide resins. Preferred kinds of flexible epoxide resins include those derived from the diglycidyl ethers of long chain aliphatic diols, for example polyalkyleneglycols, in particular polypropylene glycols, which may have molecular weights up to about 2000, as well as polymethylene diols. Other epoxides may also be used, if appropriate in conjunction with a flexible epoxide resin. In particular, the glycidyl ethers of bisphenol A and derivatives thereof, formed by the reaction of bisphenol A and 1'-chloromethyl oxirane, may be employed as the epoxide for the epoxide resin, preferably in addition to a flexible epoxide resin. Hardeners and reactive diluents may also be employed, in accordance with the normal practise of formulation of epoxide resin compositions.

The effect of the epoxide resin is relatively to improve the properties of the coal digest, particularly in regard to resistance to flow as the epoxide resin cures. It additionally increases, to a certain extent, the resistance of the coal digest to spilt compositions and diminishes the tendency of the coal digest to soften by absorption of solvents, particularly aromatic solvents. The coal digest makes the epoxide resin more flexible, as well as improving the resistance of the resin to attack by oxygenated solvents and aliphatic solvents.

The plastics composition may also contain a finely divided particulate filler. The filler is believed to assist in modifying the flow characteristics of the plastics composition. Any compatible filler may be employed, for example talc, whiting, clay, slate dust and carbon black. Conveniently up to 20% of the filler is employed, although it is often preferred to employ less than 10% of the filler. In addition to the finely divided particulate filler, or alternatively, a fibrous filler or reinforcement may also be employed. This will conveniently comprise up to 5% of short fibres only, usually less than 10 mm. in length. A purpose of the fibres is to minimize creep of the plastics composition before the curing thereof. This is of importance if the road or other surface of a joint is cambered or otherwise sloped.

Joints in concrete and the like are conveniently sealed by pouring a fluid into the joints, and allowing the fluid to solidify. For the purpose of the present invention, it is therefore preferred to employ a fluid composition, at such an elevated temperature, if required, as will allow curing at a suitable rate. The fluid composition will comprise an admixture of the coal digest with an uncured epoxide and a curing agent or hardener therefor, with any other component of the sealant composition. It is preferred not to employ elevated temperatures, since this is often inconvenient and may give rise to difficulties relating to the curing of the epoxide desin, particularly the non-uniform curing thereof.

The invention further includes a two-part system for a plastics composition comprising, in one part, an epoxide, and in the other part, a hardener therefor, coal digest being in admixture with either the epoxide or the hardener for the epoxide. It may be more convenient to mix the coal digest with the hardener, since it is believed that the coal digest may react slowly with the epoxide.

Advantageously, an epoxy resin primer may be employed to improve the adhesion of the plastics composition to the material, for example the concrete, of the joint.

It is to be understood that the invention is not to be considered as being limited to joints in concrete, but is suitable for joints or cracks in any appropriate circumstances and material, for example in asphalt.

The following non-limitative examples illustrate the invention.

EXAMPLE 1

A coal digest was manufactured by digesting coal at 300° C. with a pitch at atmospheric pressure, and was then extended with anthracene oil to give a coal digest having a Ring and Ball softening point of 85° C. and a needle penetration index of 20. 44 parts of this digest were mixed with 30 parts of anthracene oil, 5 parts of filler and 15 parts of an epoxide. The opoxide was a diglycidyl ether of a polypropylene glycol, in admixture with a bisphenol A/1'-chloromethyloxirane product, having, on average, one gram equivalent of oxirane rings for each 400 to 455 grams of epoxide.

The foregoing mixture was mixed until homogeneous, and 5 parts of hydroxyalkylated polyamine hardener was added and the mixing continued until the hardener had been fully dispersed. The mixture was then poured into a mould and allowed to cure.

The cured composition was found to have excellent stability to heat and cold, excellent resistance to oils, aliphatic and aromatic hydrocarbons and low molecular weight oxygenated solvents. The cured mixture has excellent flexing properties, which were not seriously detrimentally affected by any of the foregoing treatments.

EXAMPLE 2

Two plastics compositions were made containing:

|  | Composition | |
|---|---|---|
|  | A | B |
| Coal digest (similar to Example 1) | 41.9 | 38 |
| Anthracene oil | 29.9 | 27 |
| Epoxide resin (similar to Example 1) | 20 | 25.5 |
| Hardener | 3.3 | 4.2 |
| Whiting filler | 5.5 | 5.3 |

The plastics compositions were thoroughly mixed at room temperature and poured into appropriate receptacles for testing. The testing commenced after curing, that is after the penetration had reached a constant maximum value.

The plastics compositions were contacted with a test solution for various periods of time. The fuel was a mixture of 70% by volume A.S.T.M. standard isooctane and 30% by volume toluene. The cone penetration indices were then determined; the results are shown in Table 1.

The cone penetration values and the Shore hardness were determined at various temperatures. The results are shown in Table 2.

TABLE 1

|  | Composition A | | | | Composition B | | | |
|---|---|---|---|---|---|---|---|---|
| Days | 0 | 1 | 7 | 28 | 0 | 1 | 7 | 28 |
| Fuel | 55 | 51 | 49 | 40 | 17 | 15 | 13 | 13 |
| Sea water | 53 | 51 | 49 | 51 | 20 | 21 | 19 | 20 |

TABLE 2

|  | Composition A | | | | Composition B | | | |
|---|---|---|---|---|---|---|---|---|
| Temperature, °C | 60 | 25 | 0 | −15 | 60 | 25 | 0 | −15 |
| Cone penetration | 65 | 50 | 25 | 18 | 24 | 17 | 13 | 10 |
| Shore hardness A scale | 10 | 15 | 30 | 60 | 44 | 47 | 56 | 79 |

EXAMPLE 3

Table 3 below show plastics compositions according to the invention suitable for use as joint sealants, and the cone penetration indices thereof, taken after full curing.

TABLE 3

| Coal digest as Example 1 | 47.2 | 38.2 | 41.2 | 40.9 | 31.8 | 41.7 |
|---|---|---|---|---|---|---|
| Anthracene oil | 33.5 | 27.3 | 29.4 | 29.3 | 22.7 | 29.9 |
| Whiting | 0.0 | 15.3 | 10.3 | 5.3 | 5.3 | 5.3 |
| Epoxide | 16.5 | 16.5 | 17.0 | 21.0 | 34.3 | 19.8 |
| Hardener | 2.7 | 2.7 | 2.1 | 3.5 | 5.7 | 3.3 |
| Cone penetration index | 65 | 23 | 30 | 19 | 10 | 35 |

The compositions of Examples 2 and 3, as can be seen from Example 2 in particular, had good resistance to fuel hydrocarbons and were not seriously detrimentally affected by adverse temperature conditions. In addition to the particular properties set out, they had excellent flexing properties which were not seriously detrimentally affected by fuels, oils, oxygenated solvents or temperature. In addition, during curing, the plastics composition was found to have reasonably good flexing and fuel resistance properties. This is a considerable advantage over those hitherto employed as it enables the surfaces in which the joints have been sealed with the plastics composition of the present invention to be used relatively soon after the joints have been sealed, and with a minimum of resealing required through premature failure during curing.

The cone penetration index is that given by Institute of Petroleum Test I.P. 50/69 (A.S.T.M. test D217–68) using the standard cone of moving weight 150 g. at a temperature, unless otherwise stated, of 25° C., and was tested the sample prepared by pouring the plastics composition into an appropriate receptacle.

Softening points in this specification and claims are Ring and Ball softening points as determined by Institute of Petroleum method 58/65.

All percentages in this specification and claims are by weight of the total composition unless the contrary intention is specified.

We claim:

1. A joint sealant formed by the admixture and curing of an oil-extended coal digest having a needle penetration index, converted to a Ring and Ball softening point of 85° C. of between 10 and about 45, an epoxide compatible therewith and a hardener reactable with said epoxide to form a flexible epoxide resin in which at least a portion of the epoxide is a glycidyl ether formed by the reaction of 2,2-bis(4-hydroxyphenyl)propane and 1'-chloromethyloxirane, said coal digest being extended with an oil or tar having a penetration index in excess of about 500.

2. The joint sealant of claim 1 in which at least a portion of the epoxide is a diglycidyl ether of a polyalkyleneglycol.

3. The joint sealant of claim 1 wherein the polyalkylene glycol is polymethylene diol.

4. The joint sealant of claim 1 including up to about 20% of a finely divided particulate filler.

5. The joint sealant of claim 4 including up to about 5% of a short fibrous filler or reinforcement.

6. The joint sealant of claim 1 wherein said oil extended coal digest contains between about 0.5 and about 1 part of oil or tar for each part of coal digest.

References Cited
UNITED STATES PATENTS

| 2,894,848 | 7/1959 | Goodwin et al. | 106—278 |
|---|---|---|---|
| 3,048,494 | 8/1962 | Sawyer | 106—278 |
| 3,133,033 | 5/1964 | St. Clair et al. | 260—28 |
| 3,536,562 | 10/1970 | Shipp et al. | 260—28 X |
| 3,190,845 | 6/1965 | Goodnight | 260—28 |

LEWIS T. JACOBS, Primary Examiner

U.S. Cl. X.R.

106—273 R, 279, 284

UNITED STATES PATENT OFFICE
CERTIFICATE OF CORRECTION

Patent No. 3,793,276          Dated February 19, 1974

Inventor(s) Geoffrey Vincent Dallow Blunt and Newton John Hodges

It is certified that error appears in the above-identified patent and that said Letters Patent are hereby corrected as shown below:

Claim 3, lines 2 and 3, cancel "the polyalkylene glycol" and insert --a portion of the epoxide--.

Signed and sealed this 13th day of August 1974.

(SEAL)
Attest:

McCOY M. GIBSON, JR.        C. MARSHALL DANN
Attesting Officer            Commissioner of Patents